(12) United States Patent
Hanna et al.

(10) Patent No.: US 6,801,998 B1
(45) Date of Patent: Oct. 5, 2004

(54) METHOD AND APPARATUS FOR PRESENTING ANONYMOUS GROUP NAMES

(75) Inventors: Stephen R. Hanna, Bedford, MA (US); Anne H. Anderson, Acton, MA (US); Yassir K. Elley, Waltham, MA (US); Radia J. Perlman, Acton, MA (US); Sean J. Mullan, Sandymount Dublin-4 (IE)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/439,246

(22) Filed: Nov. 12, 1999

(51) Int. Cl.$^7$ .............................. H04L 9/00; H04K 1/00; G06F 11/30

(52) U.S. Cl. ...................... 713/155; 713/158; 713/175; 713/184; 713/201

(58) Field of Search ................................ 713/155, 158, 713/184, 201, 175

(56) References Cited

U.S. PATENT DOCUMENTS

| | | | |
|---|---|---|---|
| 5,060,263 A | | 10/1991 | Bosen et al. ................. 380/25 |
| 5,220,604 A | * | 6/1993 | Gasser et al. ................. 707/9 |
| 5,315,657 A | * | 5/1994 | Abadi et al. ................. 713/201 |
| 6,088,805 A | | 7/2000 | Davis et al. ................. 713/202 |

OTHER PUBLICATIONS

*Method of One–Way Authentication Via Passphrase*, IBM Technical Disclosure Bulletin, Nov. 1993, vol. 36, No. 11, pp. 255–260.

IETF, RFC 2692, Network Working Group, SPKI Requirements, Sep. 1999, pp. 1–13.

IETF, RFC 2693, Network Working Group, SPKI Certificate Theory, Sep. 1999, pp. 1–38.

*Network Security Private Communication in a Public World*, Charlie Kaufman, Radia Perlman, Mike Speciner, 1995, pp. 177–203.

* cited by examiner

Primary Examiner—Matthew Smithers
Assistant Examiner—Courtney D. Fields
(74) Attorney, Agent, or Firm—Foley Hoag, LLP

(57) ABSTRACT

A method and system for granting an applicant associated with a client computer in a client-server system access to a requested service without providing the applicant with intelligible information regarding group membership. The applicant transmits a request for service to an application server over a computer network. In response, the application server prepares an encrypted message which includes the identification of the group or groups having access privileges and transmits the encrypted message to the client along with a request that the client prove membership in at least one of the groups. The message is encrypted with an encryption key which can be decrypted by a group membership server.

54 Claims, 7 Drawing Sheets

METHOD AND APPARATUS FOR PRESENTING ANONYMOUS GROUP NAMES

CROSS REFERENCE TO RELATED APPLICATIONS

N/A

STATEMENT REGARDING FEDERALLY SPONSORED RESEARCH OF DEVELOPMENT

N/A

BACKGROUND OF THE INVENTION

The present invention relates to computer network security techniques and more particularly to a method and system for granting an applicant the right of access to a computer resource without disclosing intelligible information to the applicant regarding the group having access to the resource.

In computer systems and networks, including client-server systems, the need to control access to various services and resources is well understood and most systems employ techniques for assuring that applicants seeking to use available resources and services are authorized to use the same. Security precautions are taken within most computer networks to maintain the integrity of data within the network and to assure that the privacy of sensitive information is maintained. By way of example, it may be desirable to allow only individuals possessing sufficient rights to access and/or modify particular files, access certain directories, create and/or view directory structures, read specific web pages, etc. There are advantages and disadvantages associated with the use of different techniques for controlling access to available computer resources. In some computer systems, group membership lists are employed to determine whether an applicant that requests a service, or access to a computer resource, has the right of access to the respective service or resource. Each such list may include the identification of one or more members that have access to the specified service or resource. Upon receipt of a request from a user or process (collectively referred to herein as an applicant) associated with a client of a client/server system, the recipient of the request (typically a server) determines whether the applicant is a member of a group having the right to perform the requested operation. If the applicant has the right to perform the specified operation, the operation proceeds. If the applicant is not authorized, i.e. is not a member of the group having a right of access, access to the resource is denied or the operation is aborted, as applicable.

Servers which maintain group membership lists can be prone to denial of service attacks from malicious users. More particularly, a malicious user may repetitively request that a target server delete a file under one or more user names though the malicious user knows that insufficient access rights exist. The server, in such a circumstance, in response to each request, verifies that the user is authorized to obtain access to the resource. This verification may involve the comparison of the user to a group membership list maintained on a different membership server. As a consequence, the target server must forward an inquiry message to the membership server and await a response from that server. This process utilizes server and network resources and can introduce considerable latency in the determination of whether the user is authorized to obtain the requested service. Alternatively, the target server may maintain group membership lists and may compare the user identifier to the members listed on the group membership lists for groups having the right of access to the specified resource. The analysis of each request and the denial of service in response to each request from the malicious user also utilizes server resources. In either event, the intentional repetitive forwarding of requests to a server which will be denied service by a malicious user can utilize significant server bandwidth and can degrade or disrupt server operation.

Some systems are designed in a manner to avoid the need for the target server to make the determination of whether the applicant has sufficient rights to obtain access to the relevant service or resource. More particularly, in some systems the applicant associated with a client forwards a request for service to a target server, and the target server, in response, requires that the applicant prove membership in a group having sufficient rights to obtain the requested service. Typically, the request from the target server to the applicant or client, in such a circumstance, includes an identification of one or more groups including members authorized to obtain the requested service. Upon submission of proof of membership in one of the specified groups, the applicant is provided access to the resource or the specified operation is performed. The proof may be in the form of a certificate signed by a trusted party certifying membership in one of the specified groups having the right of access to the resource or via a similar message from the client to the server.

In systems in which security is a significant concern, it may be desirable not to provide the applicant with intelligible information regarding the identification of groups having access to specific resources since such information may be employed by a malicious user in an attempt to attack the system. For example, if a user transmits a request to a server to delete a file, in response, the server may forward a request to the user to prove membership in the "Admin-"group. Such may provide the user with the knowledge that if he can impersonate any member of the "Admin"group, he will be able to perform the specified deletion and possibly other deletion operations.

Rather than providing descriptive information in response to a request for service, the server may respond by requesting proof of membership in a group bearing a name which does not include descriptive content regarding group membership (i.e. "Group 251, Subgroup 75"). However, if different users attempt to delete a file and they receive a request for proof of membership in the same group in response, information may be deduced regarding the group having access rights. Similarly, if an applicant requests service from different servers and requests for proof of membership in the same group are received in response, such may also provide the applicant with information which can be used by a malicious user in determining how to circumvent security mechanisms within the system.

Cryptographic techniques such as public key cryptography and symmetric key cryptography techniques are well known and have been applied to provide secure transmission of information from one user or computer within a network to another user or computer within the network. Additionally, cryptography techniques have been applied to provide a means for digitally signing messages to verify the authenticity of the sender of a message. Such techniques are well known and explained, for example, in a book published by Prentice Hall and titled Network Security, Private Communication in a Public World authored by Charlie Kaufman, Radia Perlman and Mike Speciner. Heretofore, however, cryptography techniques have not been applied to the problems discussed above.

For the reasons set forth above, it is desirable to provide a system and method for requiring an applicant for a resource in a client-server system to prove membership within a group having the right of access to the resource without providing to the applicant intelligible information regarding group membership.

BRIEF SUMMARY OF THE INVENTION

A method and system is disclosed which permits an applicant associated with a client to obtain access to a service or resource available from or through an application server. In a preferred embodiment, the applicant is required to prove membership within a group having the requisite privileges to obtain access to the service or resource without receipt of intelligible information from the application server regarding the identification of the group or groups having access privileges. In response to a request for service provided by the applicant to the application server, the application server transmits an encrypted message to the client which includes an identification of the group or groups having a right of access to the service requested by the client. In a preferred embodiment, the group identification is combined with an random or varying extension prior to encryption to form an extended group identifier. An identification of a group membership server that maintains group membership information may also be transmitted along with the encrypted message in the event that multiple group membership servers are employed within the system. The identification of the group membership server is transmitted to the client by the application server in unencrypted form. Each group membership server maintains an encryption key, which may comprise the public key of a public key pair or a symmetric key. In the circumstance where the group membership server maintains a public key pair, the application server encrypts the group identification (or the group identifying information combined with the extension) with the public key of the group membership server. Upon receipt of the encrypted group identifier or the encrypted extended group identifier, as applicable, the client forwards to a default group membership server, or the group membership server identified by the application server, a request for proof that the applicant is a member of the group specified in the encrypted identifier. The group membership server receives the request from the client, decrypts the encrypted group identifier or the encrypted extended group identifier, as applicable, with the appropriate decryption key and, in a preferred embodiment, determines whether the applicant is a member of the specified group. If the applicant is a member of the specified group, the group membership server prepares a certificate, or other form of proof, which indicates that the client is a member of the relevant group. The group membership server encrypts the certificate or proof with an encryption key that can be decrypted by the application server and returns the encrypted certificate to the client. Upon receipt of the encrypted certificate, the client forwards the same to the application server. The application server then decrypts the certificate and determines whether the client is a member of the group having access to the originally requested service. In the event the application server maintains a public key pair, the group membership server may encrypt the certificate using the public key of the application server and the application server may decrypt the certificate using the application server private key. Alternatively, a symmetric key may be employed to encrypt and decrypt the certificate. In the above-described manner, intelligible information regarding the identification of the group having access to the requested service is not provided to the client while requiring the client to provide proof that it is authorized to obtain access to the requested resource. Other forms, features and variations of the above-described method and system are described with particularity below.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

A method and system is disclosed by which an applicant associated with a client may provide proof to an application server that the applicant is authorized to obtain a requested service without disclosing to the applicant intelligible information regarding the group or group members having access to the requested service. In the foregoing manner, network security is enhanced and a system is provided which is less susceptible to denial of service attacks and attacks by malicious users.

Figure 1:
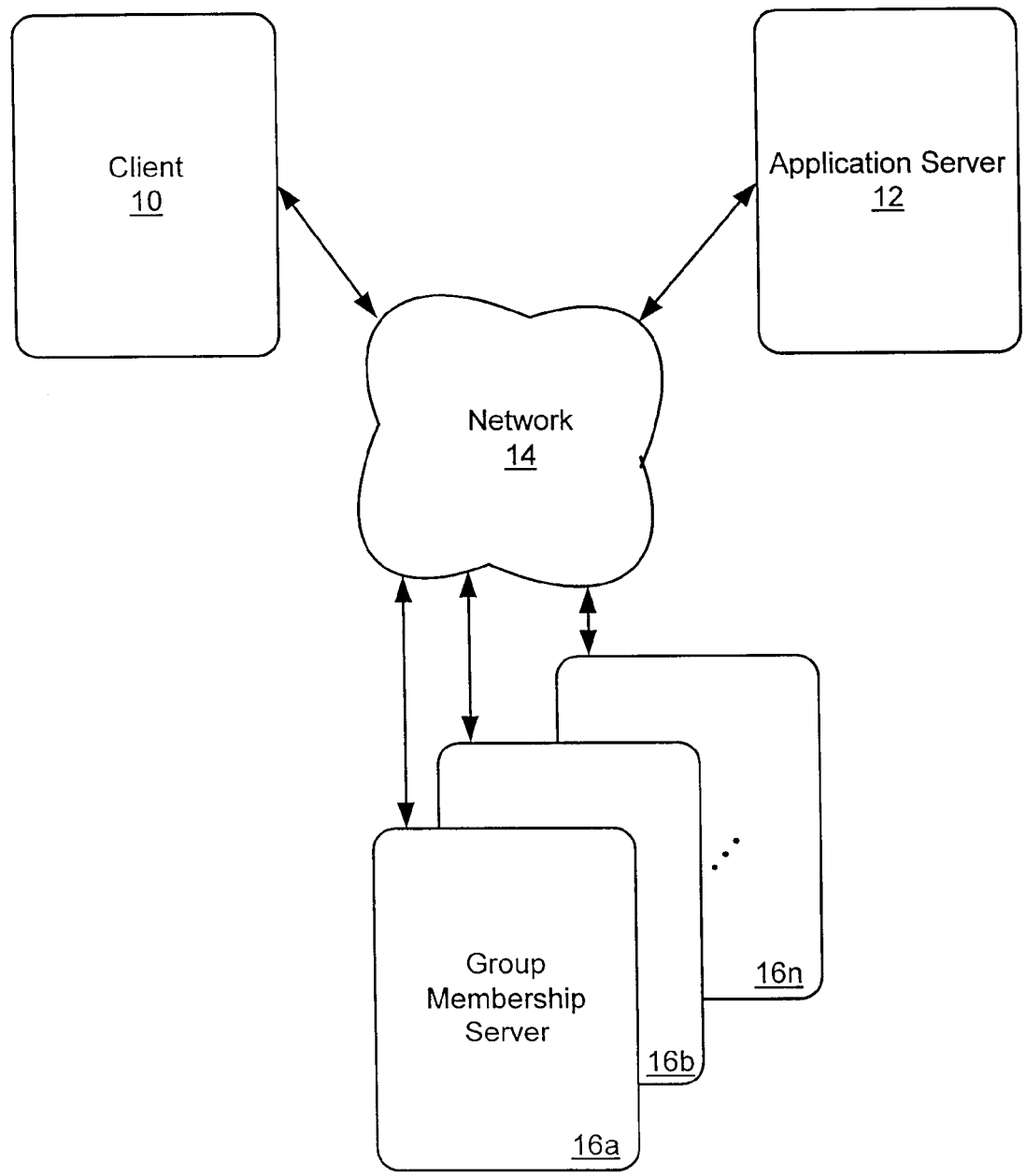
FIG. 1 is a block diagram of a system operative in a manner consistent with the present invention.

FIG. 1 depicts a simplified block diagram of a system operative in a manner consistent with the present invention. The system includes a client 10, an application server 12, and one or more group membership servers 16a–16n, which are communicatively coupled via a network 14. The client may comprise a computer or processor, a personal digital assistant (PDA) in communication with a network, an intelligent networked appliance, a controller or any other device capable of forwarding a request for service over a network to the application server 12 and performing the other functions associated with the client herein described. The network may comprise a local area network, the Internet, a wide area network or any other network for communicatively coupling the respective client 10, application server 12 and group membership servers 16.

Figure 2A:
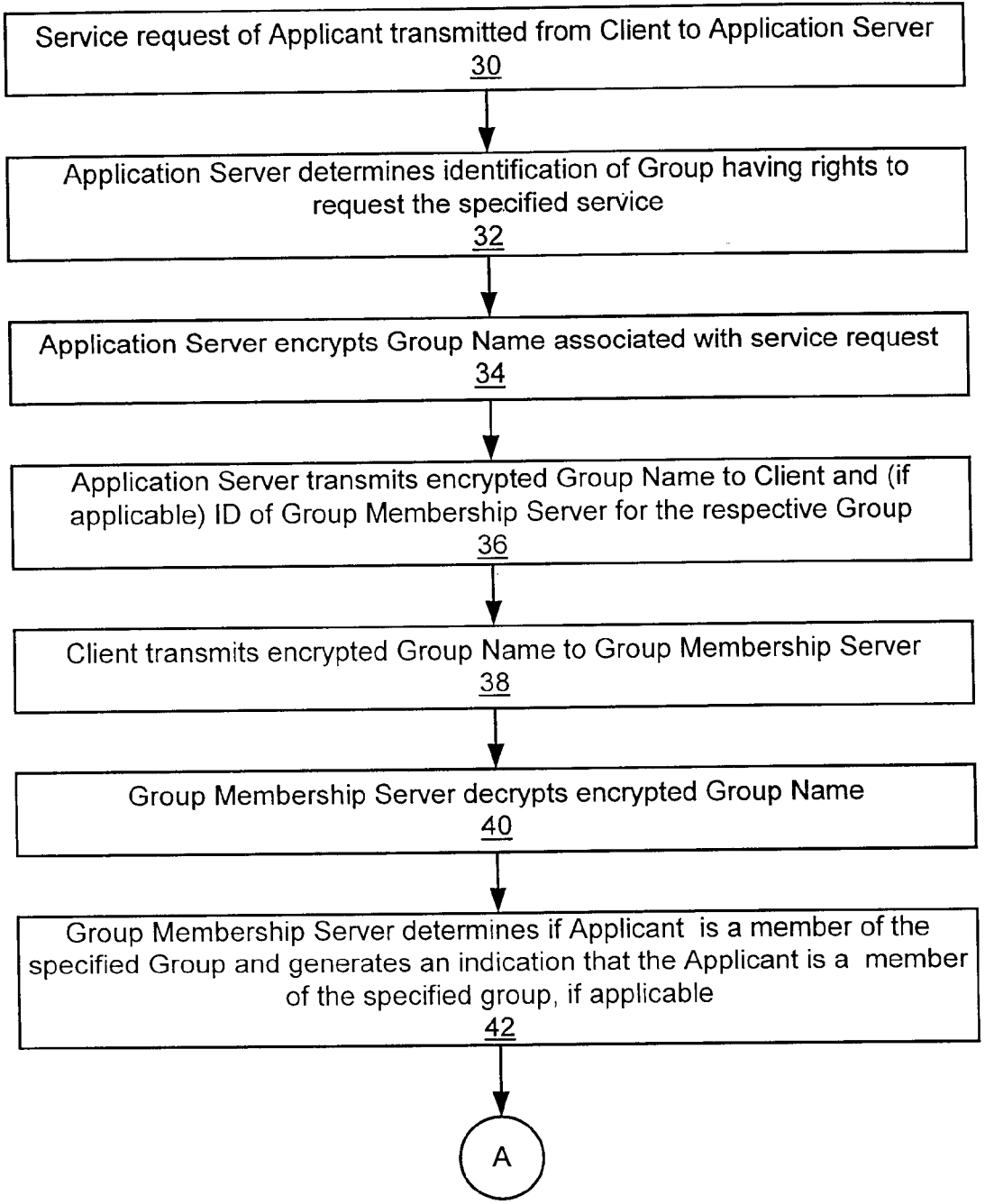
FIGS. 2a and 2b are a first flow diagram illustrating a method consistent with the present invention for an applicant to obtain access to a specified service without disclosing intelligible group membership information to the applicant.
Figure 2B:
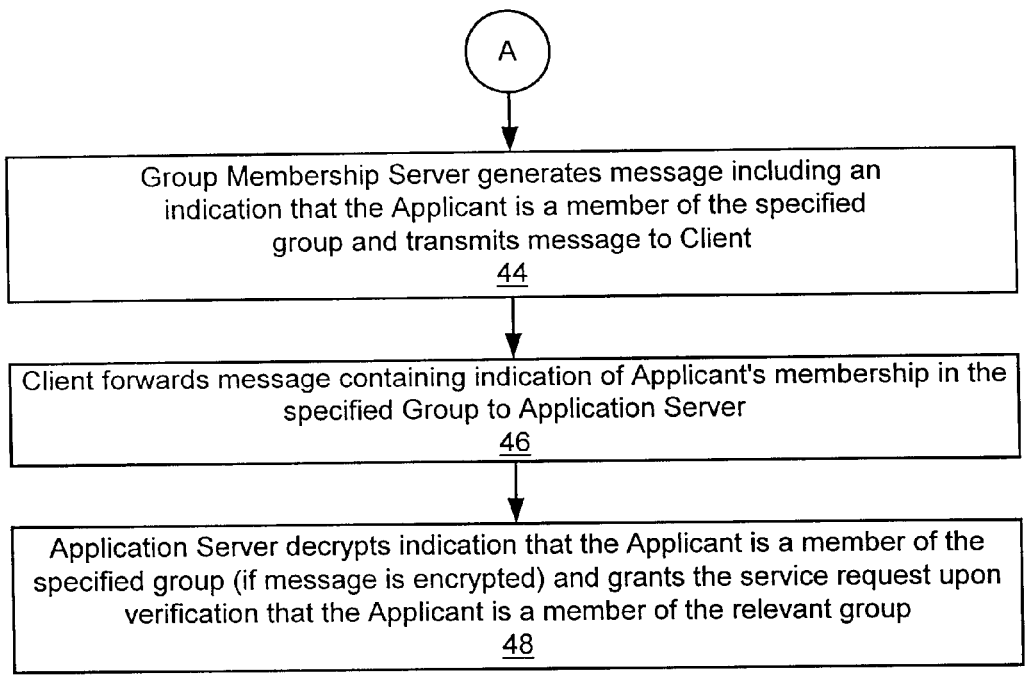

The manner in which an application server obtains proof that an applicant is a member of a group having the right to obtain a requested service is described below with respect to FIGS. 1 and 2a–2b. An applicant, which may constitute a user, a process executing on the client 10, or any other system capable of requesting a service or access to data via the network, logs onto the application server 12. The applicant then forwards a request for service to the application server 12 over the network 14 as illustrated in step 30. By way of example, the request for service may constitute a request to read, modify, create or delete a file, read a web page, access a database, perform administrative functions within the network or any other request for access to information or services available from or through the application server.

As discussed above, in certain computer systems, it may be desirable to have the applicant for a resource provide proof that they are authorized to obtain access to the resource. In such a system, the server may request that the client provide proof that the respective applicant for the service is a member of a group authorized to obtain the requested service. The server typically identifies the group or groups that are authorized to obtain the requested service and the client, in response, forwards to the server proof that the client is in fact authorized to obtain the requested service. As noted above however, this approach has the undesirable effects of disclosing to the applicant the identification of the group or groups having the right to perform specified service and additionally, underlying administrative policies.

In the presently disclosed system, these disadvantages are overcome by encrypting transmissions that contain group information and additionally, transmissions that serve to identify members within specific groups. Accordingly, the applicant and the associated client do not obtaining intelligible information regarding the identity of groups, the rights granted to specific groups or the members within such groups.

Figure 4A:
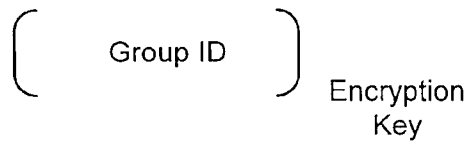
FIGS. 4a through 4e illustrate alternative forms of messages that may be forwarded from an application server to a client in response to a request for service.
Figure 4B:
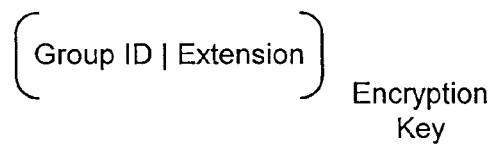
Figure 4C:
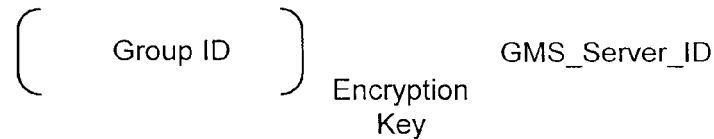
Figure 5A:
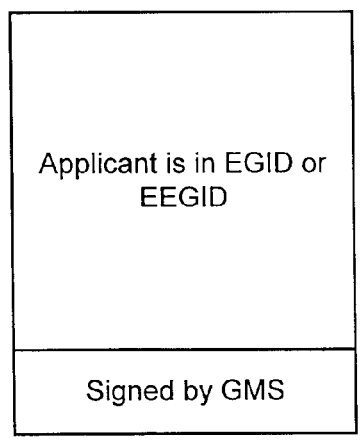
FIGS. 5a through 5d illustrate exemplary messages that may be returned from a group membership server to an application server.
Figure 5B:
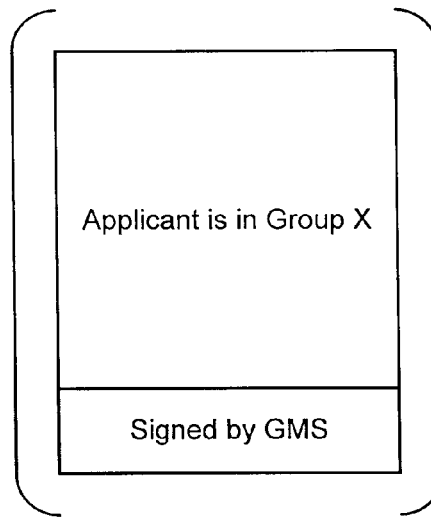
Figure 5C:
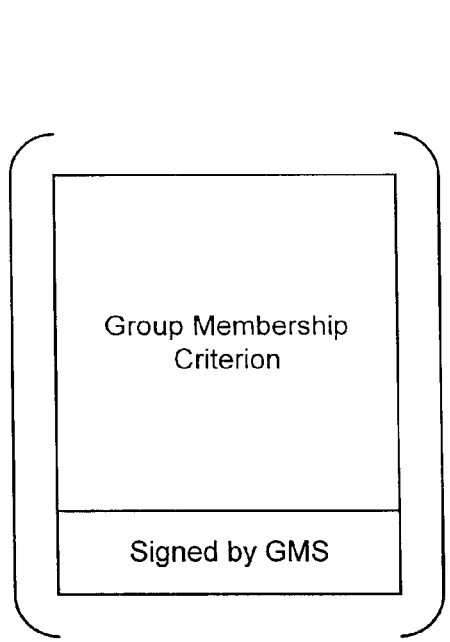
Figure 5D:
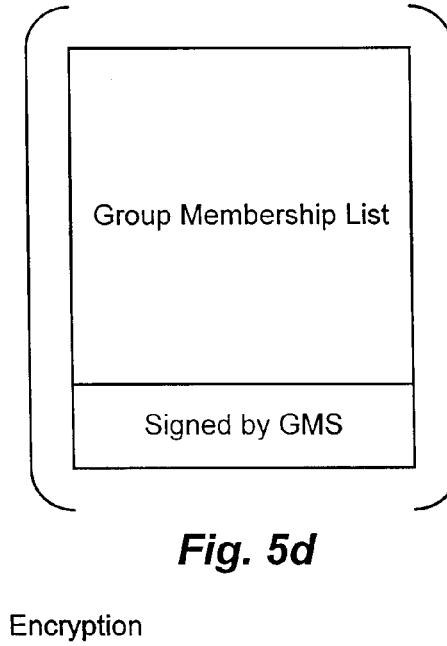

More specifically, in response to the receipt of a request for service from the applicant associated with the client 10, the application server 12 determines the identification of the group or groups having the right to perform the requested service as illustrated in step 32. For simplicity of explanation, the present example assumes a single group has the right to perform the requested service although multiple groups might have such rights. The application server 12 generates an encrypted group identification message, which may take a number of forms. For example, as depicted in FIG. 4a, the encrypted group identification message may be formed by encrypting the relevant group id (i.e. the group id for the group having access to the requested service) with an encryption key which permits decryption by the applicable group membership server 16. More particularly, the application server 12 and the group membership server may have a shared or symmetric key and the group id may be encrypted using the shared key. Alternatively, the applicable group membership server 16 may be provided with a public key pair and the group id may be encrypted using the respective group membership server public key. The application server 12 transmits the encrypted group id to the client 10 as depicted in step 36. In a system in which only one group membership server 16 is provided, the message transmitted from the application server 12 to the client 10 need not include an identification of the group membership server since a default group membership server may be identified to the client 10. In the circumstance where multiple group membership servers 16 are employed, the message transmitted from the application server 12 to the client 10 that includes the encrypted group id may also include an unencrypted identification of the group membership server 16 to which the message should be forwarded for handling as illustrated in FIG. 4c. The client 10, upon receipt of the encrypted group id, forwards the same to the default group membership server 16 or the applicable group membership server 16 specified in the message as illustrated in step 38. The group membership server receiving the encrypted group id decrypts the message to obtain the name of the group having the right of access to the requested service as shown in step 40. The group membership server then determines if the applicant is a member of the specified group as shown in step 42. If it is determined that the applicant is a member of the group, the group membership server 16 generates a message indicative of membership also as noted in step 42. As depicted in FIG. 5a, the message may comprise an unencrypted message, such as a certificate, signed by the respective group membership server that indicates that the applicant is a member of the encrypted group name. Alternatively, as depicted in FIG. 5b, the message may comprise an encrypted certificate signed by the respective group membership server 16 that indicates that the applicant is a member of the specified group. The certificate is signed by the respective group membership server 16 and encrypted using an encryption key that permits decryption by the application server. This encryption key may comprise a shared key or alternatively, the public key of a public key pair maintained by the application server 12. Additionally, as depicted in FIG. 5c, the message generated by the respective group membership server 16 may comprise an identification of group membership criterion signed by the group membership server as described in U.S. patent application Ser. No. 09/399,899, entitled Signed Group Criteria, filed Sep. 21, 1999 and incorporated herein by reference. As described therein, a test definition for membership is generated which must be satisfied before the applicant can obtain access to the requested resource. In the present circumstance, the group membership criteria for the relevant group is signed by the respective group membership server 16, encrypted using an appropriate encryption key, and forwarded for delivery to another server for analysis. For example, the group membership criterion certificate may be encrypted using a key shared with the application server or the application server public key and forwarded to the client for delivery to the application server or alternatively, may be forwarded directly to the application server. The application server 12 decrypts the message and determines whether the applicant satisfies the group membership criterion specified within the certificate. While it is recognized that this leaves the application server with the task of determining whether the applicant is authorized to obtain the requested service, in some circumstances the application server is best suited to perform the analysis of the applicant's credentials, e.g. when the application server is in possession of the necessary information. It is noted that a server other than the application server may be assigned the task of verifying whether the applicant satisfies the group membership criterion. In such event, the group membership server 16 forwards the encrypted group membership criterion certificate to a group membership analysis server (e.g. server 16n) either directly or via the client 10. The certificate is encrypted with a key shared with the analysis server 16n or the public key of a public key pair maintained by the analysis server 16n. In the event the analysis server 16n verifies that the applicant satisfies the criterion, the application server 12 is notified via one of the techniques described herein or any other suitable notification method. Further, as depicted in FIG. 5d, a certificate generated by the group membership server 16 may comprise an encrypted certificate including a group membership list signed by the respective group membership server 16. As discussed with respect to FIG. 5b, the certificate may be encrypted using a key shared between the respective group membership server 16 and the application server 10 or alternatively, the application server 12 public key. As indicated in step 44, the respective group membership server 16 then transmits the message indicative of group membership to the client 10. The client 10 forwards the indication of membership to the application server 12 as depicted in step 46. The application server 12 then decrypts the received message, if necessary, and performs the service initially requested by the applicant upon verification that the applicant is a member of the group.

Although as illustrated in FIGS. 5a–5d the group membership server provides an authenticated message in the form of a certificate, other authentication techniques known in the art may be employed. For example, the message may be authenticated using a keyed hash, a cryptographic hash incorporated in an encrypted message or any other suitable authentication technique for authenticating the message forwarded by the group membership server.

Moreover, to prevent the encrypted certificates depicted in FIGS. 5b–5d from containing the same information each time the respective certificate is forwarded, an extension value may be appended to the message content portion within the certificate. The extension, as in the case of the extension applied in the extended group identifier, may comprise a random number, a pseudo-random number, a number within a sequence of numbers, a date and time value, or any other value which changes each time the message generated by the group membership server is generated.

Figure 3A:
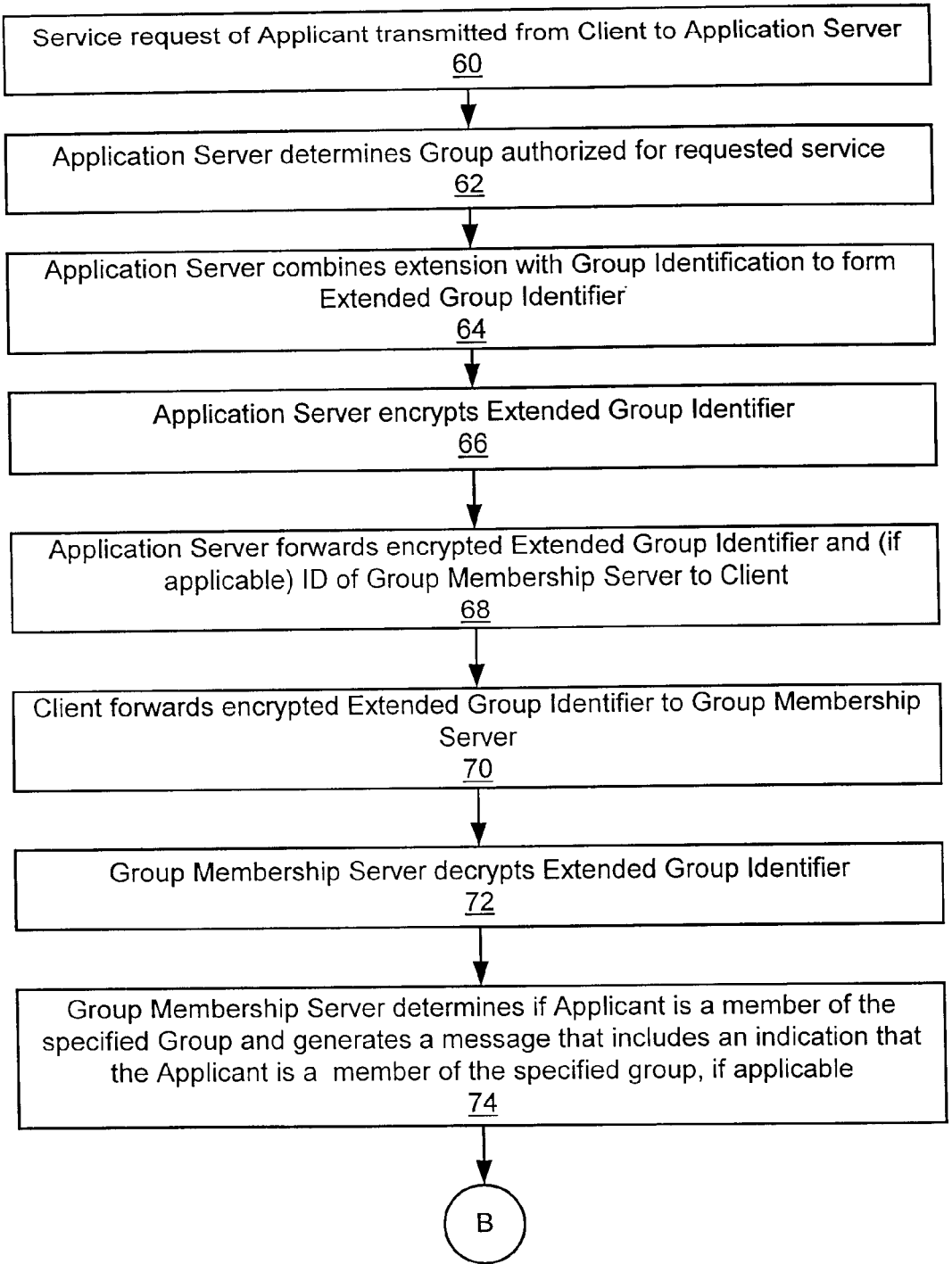
FIGS. 3a and 3b are a second flow diagram illustrating a method consistent with the present invention for an applicant to obtain access to a specified service without disclosing intelligible group membership information to the applicant.
Figure 3B:
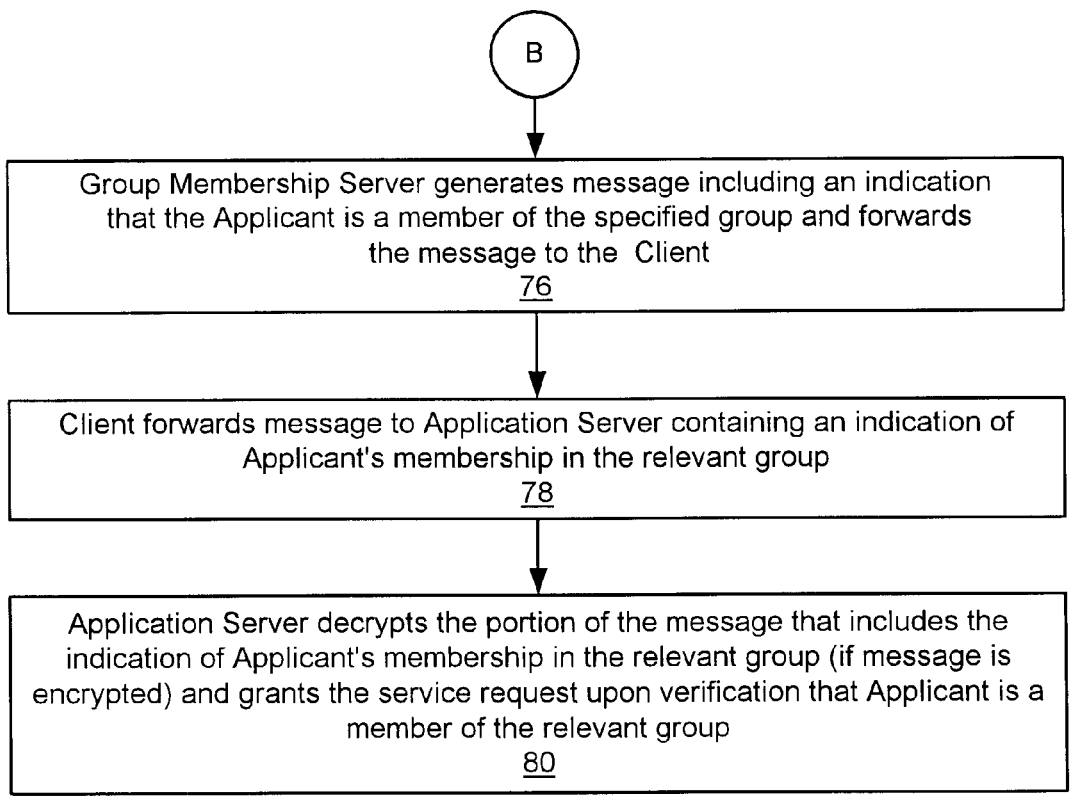
Figure 4D:

While the above described method avoids the disclosure of certain group identifying and membership information to the applicant, it is noted that a malicious user may be able to discern information regarding group membership even from the encrypted group name since the same encryption key applied to the same group id will provide a uniform result each time the same group id is encrypted by the application server 12. Increased network security to address this concern may be achieved via the method illustrated in FIGS. 3a–3b. As illustrated in step 60 a request for service is initiated by an applicant and transmitted to the application server 12. The application server 12 determines which group or groups are authorized to obtain the requested service as shown in step 62. As before, for simplicity, the method is illustrated using a single group, however, it should be appreciated that multiple groups might have the right of access to the requested service. After identifying the group having a right of access to the requested service, the application server 12 adds an extension to the group identifier to produce an extended group identifier as shown in step 64. The extension may be a random number, pseudo-random number, a number within a sequence of numbers, a date and time or any other value, which changes each time the value is generated. The extended group identifier is then encrypted as illustrated in step 66 using a key shared between the application server 12 and the applicable group membership server 16 or the public key of the respective group membership server 16. The format of the encrypted extended group identifier is depicted in FIGS. 4b and 4d. In view of the combination of the extension with the group identifier, the encrypted result will differ each time a request is made even in the event of a request for the same service. The application server 12 then forwards the encrypted extended group identifier (EEGID) to the client 10 and requests the client 10 to provide proof of membership in the group specified within the encrypted extended group identifier. In the event that a default group membership server is employed by the client, the message includes the information illustrated in FIG. 4b and may omit the identification of the group membership server to which the encrypted extended group identifier should be forwarded. If multiple group membership servers 16 are employed, the message transmitted to the client 10 from the application server 12 includes an unencrypted identification of the respective group membership server 16 as illustrated in FIG. 4d. The client 10 forwards the encrypted extended group identifier to the group membership server specified in the message or the default group membership server 16, as applicable, as shown in step 70. The group membership server 16 then decrypts the encrypted extended group identifier as noted in step 72 using a key shared with the application server 12 or the group membership server private key, as applicable. The group membership server 16 next ignores the extension information and determines if the applicant is a member of the group specified by the group identifier in the decrypted extended group identifier as shown in step 74. In the event that the group membership server 16 confirms that the applicant is a member of the specified group, it generates a message which includes proof that the applicant is a member of the group, encrypts the message, as applicable, and forwards the message to the client 10 as shown in step 76. The message may be in the form of the messages and certificates discussed above with respect to FIGS. 2a and 2b. The client 10 then forwards the message to the application server 12 as illustrated in step 78. The application server 12, then decrypts the message if the transmitted message was encrypted and, as depicted in step 80, grants the applicant access to the service which was the subject of the respective service request upon verification that the applicant is a member of the group having the right of access to the service. In the foregoing manner, intelligible information regarding group membership is not made available to the applicant or client during the authorization process.

Figure 4E:
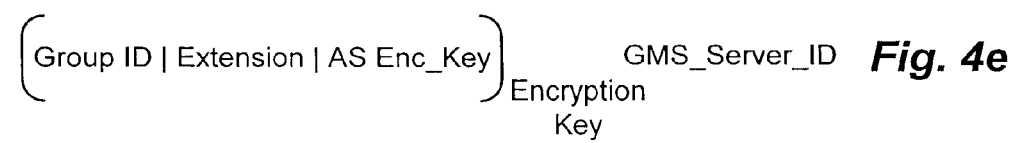

As illustrated in FIG. 4e, the encrypted extended group identifier transmitted from the application server 12 to the client 10 may include an encryption key to be used by the group membership server for the return message. This encryption key may comprise a key to be shared between the application server 12 and the respective group membership server 16 or the public key of the application server 12 in the event public key cryptography is employed.

It is further noted that the encrypted group identifier or the encrypted extended group identifier, as applicable, may be transmitted directly to the respective group membership server 16 by the application server 12 to conserve network bandwidth. Similarly, the responsive message from the respective group membership server 16 to the relevant application server 12 may be transmitted directly from the group membership server 16 to the application server 12 to conserve network bandwidth and client resources. In the event that the return message from the group membership server 16 to the application server 12 is to be forwarded directly to the application server 12 and not directed through the client 10, the encrypted group identifier or encrypted extended group identifier includes an identification of the application server 12 so as to permit the direct response to be transmitted by the respective group membership server 16.

Further, it is noted that proof of membership within a group may involve the possibility that the group identified within the encrypted group identifier or the encrypted extended group identifier includes a number of subgroups. For example, assume that the group membership server 16a receives a request for proof that the applicant is a member of group X. Upon inquiry, the group membership server 16a determines that group X is composed of subgroup Xa which is managed by group membership server 16b and subgroup Xb which is managed by group membership server 16c. In such event, the group membership server 16a forwards requests to the group membership servers 16b and 16c respectively, requesting proof that the applicant is a member of the respective subgroups. In response, the subgroup servers 16b and 16c forward a message, such as a certificate signed by the respective subgroup servers 16b and 16c, indicating whether the applicant is a member of the respective subgroup which may be provided in the forms discussed above with respect to certificates and responses provided by the group membership server. The group membership server 16a generates a message and forwards the same to either the client 10 or the application server 12. It should be noted that authorization may be provided for access to the service in the event the applicant is a member of any one of the possible subgroups, in the event the applicant is a member of every possible subgroup, or based upon any other appropriate administrative policy.

To improve the performance of networks employing the presently disclosed authorization technique, the application server 12 may cache encrypted extended group identifiers obtained in response to specific requests and use the same encrypted extended group identifiers when forwarding the encrypted extended group identifier to the client 10. Similarly, the client 10 may cache certificates obtained from the respective group membership server(s) 19 against encrypted group identifiers or encrypted extended group identifiers, as applicable, and return the certificate from the client 10 cache to the application server 12 in the event the encrypted group identifier or encrypted extended group identifier matches a corresponding identifier in the cache. Caching of certificates in the above-described manner minimizes both demands on the group membership server(s) 16 and reduces network traffic between the client 10 and the group membership server(s) 16.

Additionally, a group membership server 16a, upon receipt of a message from a client requesting proof of membership, may, in response, instruct the client 10 to seek authorization from one or more other group membership servers, such as group membership servers 16b and 16n. The other group membership servers, for example, 16b and 16n, would forward a certificate or other authorization message to the client 10 for forwarding to the group membership server 16a. Alternatively, the group membership servers 16b and 16n may forward the certificate or authorization message directly to the group membership server 16a provided that the group membership servers 16b and 16n were provided with the identity of the group membership server 16a so as to permit direct addressing of the group membership server 16a.

Those skilled in the art should readily appreciate that the programs defining the functions consistent with the present invention can be delivered to the client 10, application server 12 and group membership servers 16 in many forms; including, but not limited to: (a) information permanently stored in a non-writable storage media (e.g. read-only memory devices within a computer such as ROM or CD-ROM disks readable by a computer I/O attachment); (b) information alterably stored on writable storage media (e.g. floppy disks, tapes, read/write optical media and hard drives); or (c) information conveyed to a computer through a communication media, for example, using baseband or broadband signaling techniques, such as over computer or telephone networks via a modem. In addition, while in the presently disclosed embodiments, the functions are illustrated in the form of software methods executing out of a memory on respective client 10, application server 12 and group membership servers 16, the presently described functions may alternatively be embodied in whole or in part using hardware components such as Application Specific Integrated Circuits (ASICs), state machines, controllers or other hardware components or devices, or a combination of hardware components and software processes without departing from the inventive concepts herein described.

Those of ordinary skill in the art should further appreciate that variations to and modifications of the above-described methods and system for granting access to a computer resource may be made without departing from the inventive concepts disclosed herein. Accordingly, the invention should be viewed as limited solely by the scope and spirit of the appended claims.

What is claimed is:

1. A method for providing access to a resource in a network, said network including a client, an application server, and a group membership server, said method comprising:

at said application server:
  receiving a request for service from an applicant associated with said client;
  in response to receiving said request for service, generating a first message portion that includes an identification of a group authorized to perform said service;
  encrypting said first message portion to form an encrypted first message portion that permits decryption by said group membership server, but not by said client; and
  transmitting said encrypted first message portion over said network for delivery to said client;

at said group membership server:
  receiving said encrypted first message portion from said client;
  decrypting said encrypted first message portion;
  if said applicant is a member of said group identified by the first message portion thereby decrypted, generating a response message portion containing an indication that said applicant is a member of said group;
  transmitting said response message portion over said network for delivery to said client; and at said application server:
  in response to receiving said response message portion from said client, performing said requested service.

2. The method of claim 1 wherein encrypting said first message portion comprises:
  generating a first extension value;
  combining said first extension value with said group identification to form an extended group identifier; and
  encrypting said extended group identifier to form said encrypted first message portion.

3. The method of claim 2 wherein generating a first extension value comprises generating a random number.

4. The method of claim 2 wherein generating a first extension value comprises generating a pseudo random number.

5. The method of claim 2 wherein generating a first extension value comprises generating a number within a sequence of numbers.

6. The method of claim 2 wherein generating a first extension value comprises generating a date and time stamp.

7. The method of claim 1 wherein encrypting said first message portion comprises encrypting said first message portion with an encryption key which permits decryption of said first message portion only by said group membership server.

8. The message of claim 7 wherein said encryption key comprises a symmetric key shared by said application server and said group membership server.

9. The method of claim 7 wherein said group membership server maintains a public key pair comprising a public key and a private key and said encryption key comprises the group membership server public key.

10. The method of claim 1 wherein transmitting said encrypted first message portion from said application server to said client comprises transmitting said encrypted first message portion and an address of said group membership server from said application server to said client.

11. The method of claim 1 wherein generating said response message portion comprises generating an authenticated message which contains said indication that said applicant is a member of said group.

12. The method of claim 11 wherein generating said authenticated message comprises generating a certificate which is digitally signed by said group membership server and which contains said indication that said applicant is a member of said group.

13. The method of claim 1 wherein generating said response message portion comprises generating an authenticated message which contains an indication that said applicant is a member of said encrypted first message portion.

14. The method of claim 13 wherein generating said authenticated message comprises generating a certificate which is digitally signed by said group membership server and which contains an indication that said the applicant is a member of said encrypted first message portion.

15. The method of claim 1 wherein generating said response message portion comprises generating an encrypted authenticated message which contains an indication that said applicant is a member of said group, wherein said encrypted authenticated message is encrypted such that it is decipherable by said application server, but not by said client.

16. The method of claim 15 wherein said encrypted authenticated message comprises an encrypted certificate which is digitally signed by said group membership server.

17. The method of claim 15 wherein said authenticated message further includes an extension value that is unrelated to said indication that said applicant is a member of said group.

18. The method of claim 1 wherein generating said response message portion comprises generating an encrypted authenticated message which contains a group membership list that includes an indication of said applicant, wherein said encrypted authenticated message is encrypted such that it is decipherable by said application server, but not by said client.

19. The method of claim 18 wherein said encrypted authenticated message comprises an encrypted certificate which is digitally signed by said group membership server.

20. The method of claim 18 wherein said authenticated message further includes an extension value that is unrelated to said group membership list.

21. The method of claim 1 wherein generating said response message portion comprises generating an encrypted authenticated message which contains a group membership criterion identifying the requirements for group membership, wherein said encrypted authenticated message is encrypted such that it is decipherable by said application server, but not by said client.

22. The method of claim 21 wherein said encrypted authenticated message comprises an encrypted certificate which is digitally signed by said group membership server.

23. The method of claim 21 wherein said authenticated message further includes an extension value that is unrelated to said group membership criterion.

24. The method of claim 1 further including, at said group membership server, encrypting said response message portion with an encryption key.

25. The method of claim 24 wherein said encryption key comprises a symmetric key shared by said group membership server and said application server.

26. The method of claim 24 wherein said application server maintains an application server public key pair including an application server public key and an application server private key and said encryption key comprises said application server public key.

27. The method of claim 1 further including, at said group membership server, ascertaining, from at least one other server, information indicative of whether said applicant is a member of said group.

28. The method of claim 27 wherein said group includes a plurality of subgroups which are each served by a respective subgroup server and ascertaining comprises ascertaining from at least one of said subgroup servers whether said applicant is a member of the respective at least one subgroup.

29. The method of claim 28 wherein said applicant is deemed to be a member of said group if the applicant is a member of at least one of said subgroups.

30. The method of claim 28 wherein said applicant is deemed to be a member of said group only if the applicant is a member of all of said subgroups.

31. The method of claim 1 wherein transmitting said encrypted first message portion from said application server to said client further comprises:
    transmitting to said client along with said encrypted first message portion an unencrypted group membership server identifying portion that identifies the group membership server to which said client should transmit said encrypted first message portion.

32. A method for providing an indication at a first computer that a request for service that is received over a computer network from an applicant associated with a second computer is authorized, comprising:
    at said first computer:
        receiving said request for service from said second computer over said computer network;
        in response to receiving said request for service, generating a first message portion that includes an identification of a group authorized to obtain the requested service;
        encrypting said first message portion to form an encrypted first message portion that permits decryption by a third computer on said computer network, but not by said second computer;
        transmitting said encrypted first message portion over said computer network for delivery to said second computer;
        receiving a response message over said network from said second computer, said response message containing group membership defining information provided by said third computer;
        determining, at least in part from group membership defining information contained in said response message, whether said applicant is a member of said group; and
        if said applicant is thereby determined to be a member of said group, providing an indication of group membership.

33. The method of claim 32 wherein encrypting said first message portion comprises:
    generating an extension value;

combining said extension value with said group identification to form an extended group identifier; and
encrypting said extended group identifier to form said encrypted first message portion.

34. The method of claim 33 wherein generating said extension value comprises generating a random number.

35. The method of claim 33 wherein generating said extension value comprises generating a pseudo random number.

36. The method of claim 33 wherein generating said extension value comprises generating a number within a sequence of numbers.

37. The method of claim 33 wherein generating an extension value comprises generating a date and time stamp.

38. The method of claim 32 wherein encrypting said first message portion comprises encrypting said first message portion with an encryption key which permits decryption of said first message portion only by said third computer.

39. The message of claim 38 wherein said encryption key comprises a symmetric key shared by said first and third computers.

40. The method of claim 38 wherein said third computer maintains a third computer public key pair comprising a third computer public key and a third computer private key and said encryption key comprises said third computer public key.

41. The method of claim 32 wherein transmitting said encrypted first message portion for delivery to said second computer comprises transmitting said encrypted first message portion to said second computer along with an unencrypted identification of said third computer to allow said second computer to transmit said encrypted first message portion to said third computer.

42. The method of claim 32 wherein receiving said response message comprises receiving a certificate containing a digital signature of said third computer and containing said information from which said first computer can determine whether said applicant is a member of said group.

43. The method of claim 32 wherein receiving said response message comprises receiving a certificate containing a digital signature of said third computer and an indication that said applicant is a member of said encrypted first message portion.

44. The method of claim 32 wherein receiving said response message comprises receiving an encrypted certificate containing a digital signature of said third computer and containing an indication that said applicant is a member of said group, wherein said certificate is encrypted with an encryption key which is decipherable only by said first computer.

45. The method of claim 32 wherein receiving said response message comprises receiving an encrypted certificate containing a digital signature of said third computer and containing a group membership list which includes an indication of said applicant within said list, wherein said certificate is encrypted with an encryption key which is decipherable only by said first computer.

46. The method of claim 32 wherein receiving said response message comprises receiving an encrypted certificate containing a digital signature of said third computer and containing a group membership criterion identifying the requirements for group membership, wherein said certificate is encrypted with an encryption key which is decipherable by said first computer.

47. The method of claim 32 wherein receiving said response message comprises receiving an encrypted response message wherein said response message is encrypted with an encryption key that is decipherable only by said first computer.

48. The method of claim 47 wherein said encryption key comprises a symmetric key shared by said first and third computers.

49. The method of claim 47 wherein said first computer maintains a first computer public key pair comprising a first computer public key and a first computer private key and said encryption key comprises said first computer public key.

50. The method of claim 32 wherein transmitting said encrypted first message portion over said network for delivery to said second computer further comprises transmitting to said second computer, along with said encrypted first message portion, an unencrypted third computer identifying portion that identifies the third computer to which said second computer should forward said encrypted first message portion.

51. Apparatus for providing an indication that a request for service received from an applicant over a network and associated with a client is authorized, said apparatus comprising:
an application server, said application server operative to receive said request for service, generate a first message portion than includes an identification of a group authorized to obtain the requested service, encrypt said first message portion to form an encrypted first message portion that permits decryption by a group membership server, transmit said encrypted first message portion over said network for delivery to said client, receive a response message over said network from said client, said response message containing group membership defining information provided by said group membership server, determining from said group membership defining information whether said applicant is a member of said group and, if said applicant is thereby determined to be a member of said group, providing an indication of group membership.

52. A computer program product including a computer readable medium, said computer readable medium having an application server computer program stored thereon, said application server computer program for execution in a computer and comprising:
program code for receiving a request for service over a computer network from an applicant associated with a second computer;
program code for generating, in response to the receipt of said request for service, a first message portion comprising an identification of a group authorized to obtain the requested service,
program code for encrypting said first message portion to form an encrypted first message portion that permits decryption by a third computer;
program code for transmitting said encrypted first message portion over said network for delivery to said second computer;
program code for receiving over said network a second message portion from said second computer said second message portion containing group membership defining information that is provided by said third computer and that serves to identify whether said applicant is a member of said group;
program code for verifying, upon receipt of said second message portion, whether said applicant is a member of said group authorized to obtain said requested service; and program code for providing an indication that the applicant is authorized to obtain the requested service in response to said verification.

53. A computer data signal, said computer data signal including a computer program for use in determining whether an applicant associated with a client is a member of a group authorized to obtain a requested service, said computer program comprising:

program code for receiving a request for service over a computer network from an applicant associated with a second computer;

program code for generating, in response to the receipt of said request for service, a first message portion comprising an identification of a group authorized to obtain the requested service, program code for encrypting said first message portion to form an encrypted first message portion that permits decryption by a third computer;

program code for transmitting said encrypted first message portion over said network for delivery to said second computer;

program code for receiving over said network a second message portion from said second computer said second message portion containing group membership defining information that is provided by said third computer and that serves to identify whether said applicant is a member of said group;

program code for verifying, upon receipt of said second message portion, whether said applicant is a member of said group authorized to obtain said requested service; and program code for providing an indication that the applicant is authorized to obtain the requested service in response to said verification.

54. Apparatus for providing an indication that a request for service received from an applicant over a network and associated with a client is authorized, said apparatus comprising:

means for receiving said request for service over said network;

means for generating a first message portion that includes an identification of a group authorized to obtain the requested service;

means for encrypting said first message portion to form an encrypted first message portion that permits decryption by a group membership server, but not by said client;

means for transmitting said encrypted first message portion over said network for delivery to said client;

means for receiving a response message over said network from said client, said response message containing group membership defining information provided by said group membership server;

means for determining from said group membership defining information whether said applicant is a member of said groups; and, means for providing an indication of group membership if said applicant is thereby determined to be a member of said group.

* * * * *